United States Patent [19]

Kitagawa et al.

[11] Patent Number: 5,740,470
[45] Date of Patent: Apr. 14, 1998

[54] VIBRATION REDUCING CAMERA

[75] Inventors: Yoshihisa Kitagawa, Kasukabe; Masami Takemoto, Tokyo, both of Japan

[73] Assignee: Nikon Corporation, Tokyo, Japan

[21] Appl. No.: 841,336

[22] Filed: Apr. 30, 1997

Related U.S. Application Data

[63] Continuation of Ser. No. 708,227, Sep. 6, 1996, abandoned.

[30] Foreign Application Priority Data

Sep. 12, 1995 [JP] Japan .................................. 7-233950

[51] Int. Cl.$^6$ ...................................................... G03D 7/08
[52] U.S. Cl. ............................... 396/52; 396/55; 396/222
[58] Field of Search .............................. 396/52–55, 222

[56] References Cited

FOREIGN PATENT DOCUMENTS

4-122917  4/1992  Japan .

*Primary Examiner*—Safet Metjahic
*Assistant Examiner*—Michael Dalakis

[57] ABSTRACT

A vibration reducing camera comprises a vibration reducing optical system, a vibration reducing drive unit for reducing vibrations by changing a state of the vibration reducing optical system, a state detecting unit for detecting a state of the vibration reducing optical system, a fixing unit for fixing the vibration reduction optical system in a predetermined initial state, a photographic condition changing unit for performing a predetermined number of photographing operations while stepwise changing a part of photographic conditions, a photographic condition setting unit for setting at least a number of exposures in the photographic condition changing unit, and a control unit for controlling the vibration reducing drive unit, the state detecting unit, the fixing unit and the photographic condition changing unit. The control unit defines the allowable range of variation quantity of the vibration reducing optical system on the basis of a number of exposures and an already-exposed number that are set in the photographic condition setting unit.

19 Claims, 4 Drawing Sheets

VIBRATION REDUCING CAMERA

This application is a continuation of application Ser. No. 08/708,227, filed Sep. 6, 1996, now abandoned.

BACKGROUND OF THE INVENTION

1. Field of the Invention

The present invention relates generally to a vibration reducing camera and, more particularly, to a vibration reducing camera equipped with an AE bracketing device.

2. Related Background Art

This type of vibration reducing camera has hitherto adopted a system for reducing a vibration of an object image on a photographing surface by shifting a vibration reducing lens (hereinafter referred to as a "VR lens"), as a part of a photographing optical system, in a right-angled surface direction with respect to an optical axis of the photographing optical system.

This VR lens is, upon terminating a vibration reducing movement (hereinafter referred to as a "VR movement") after finishing the photography, moved to an arbitrary position corresponding to a shake of the camera during the photography when an exposure has been finished. Then, before starting a next VR movement, it is required that a center of the VR lens be located in a predetermined initial position ("centering") with respect to the optical axis of the photographing optical system so that a movement range can be maximized.

Hitherto, this centering is executed for every photography (exposure), and thereafter the next photography (exposure) is started.

There arises, however the following problems inherent in the prior art vibration reducing camera described above in the case of incorporating a so-called AE bracketing device.

One of purposes for employing an AE bracketing mode (hereinafter referred to as an "AEB mode") is that a photo exhibiting, though framing is the same, a difference image by performing a plurality of photographing operations while varying an exposure quantity. However, the photography takes place in the AEB mode, and nevertheless it follows that the respective framing changes although blurs on the individual photos taken can be restrained by executing the centering of the VR lens each time the photography is carried out. Consequently, the problem is that the photo with the framing contrary to an intention of the photographer might be obtained.

Further, when the centering is executed for every photographing operation, the problem is that this may be a large factor of increasing a quantity of electric power consumed by the camera.

On the other hand, if simply the centering of the VR lens is omitted during the photography in the AEB mode, and if the vibrations are large, the VR lens might reach a limit of a movable range thereof for the duration of a plurality of photographing operations. This may cause a problem in which the photography continues in a state where the vibrations are not absolutely reduced.

SUMMARY OF THE INVENTION

It is a primary object of the present invention to provide a vibration reducing camera capable of properly defining a variation quantity allowable range of a vibration reducing optical system so that vibrations are adequately reduced up to the last exposure.

It is another object of the present invention to provide a vibration reducing camera with a small amount of electric power consumption.

It still another object of the present invention to provide a vibration reducing camera capable of preventing framing of consecutively taken photos from being different.

It is a further object of the present invention to provide a vibration reducing camera capable of surely performing a vibration reducing movement up to the last exposure.

To accomplish the above objects, according to the present invention, there is provided a vibration reducing camera comprising a vibration reducing optical system, a vibration reducing drive unit for reducing vibrations by changing a state of the vibration reducing optical system, a state detecting unit for detecting a state of the vibration reducing optical system, a fixing unit for fixing the vibration reduction optical system in a predetermined initial state, a photographic condition changing unit for performing a predetermined number of photographing operations while stepwise changing a part of photographic conditions, a photographic condition setting unit for setting at least a number of exposures in the photographic condition changing unit, and a control unit for controlling the vibration reducing drive unit, the state detecting unit, the fixing unit and the photographic condition changing unit. The control unit defines a variation quantity allowable range of the vibration reducing optical system on the basis of a number of exposures and an already-exposed number that are set in the photographic condition setting unit.

Preferably, the control unit operates the fixing unit when a state of the vibration reducing optical system that is obtained as a result of detection of the state detecting unit is beyond a variation quantity allowable range. Preferably, the vibration reducing camera further comprises a consecutive photographing device for performing consecutive photography, a consecutive photography setting unit capable of setting a consecutive photographing mode of operating the consecutive photographing device, or a non-consecutive photographing mode of not operating the consecutive photographing device, and a vibration reducing mode setting unit capable of an exposure-time vibration reducing mode of making the vibration reducing drive unit reduce vibrations during only an exposure, or a full-time vibration reducing mode of making the vibration reducing drive unit reduce the vibrations during the exposure and a non-exposure time. The control unit controls the vibration reducing drive unit so that the vibrations are continuously reduced during even the non-exposure time when the consecutive photography setting unit sets the consecutive photographing mode while the vibration reducing mode setting unit sets an exposure-time vibration reducing mode in a case where the photographic condition changing unit operates.

Preferably, the allowable range of variation quantity D of the vibration reducing optical system that is determined by the control unit before starting an n-th exposure is set in any one of the following four ranges and, after operating the fixing unit at first, is changed to others among the four ranges:

$0 \leq D \leq ((n-1)/N)L; n>1$ $0 \leq D \leq (1/(N-n+2))L; n>1$ $0 \leq D \leq (1/(N-n+2))(L-X(n-1))+X(n-1); n>1, X(1)=0$ $0 \leq D \leq (T(n-1)/T(N))L: n>1, T(n)=t(1)+t(2)+ \ldots +t(n-1)+t(n)$ where L is the maximum variation quantity with which the vibration reducing vibration optical system is variable, N is the number of exposures that is set by the photographing condition setting unit, X(n) is the variation quantity of the vibration reducing optical system before starting the n-th exposure, and t(n) is the exposure time of the n-th exposure.

Preferably, the control unit operates the fixing unit before the first exposure. Further, the photographic condition changing unit is an AE bracketing device for executing a predetermined number of exposures by changing one or both of a shutter speed and a stop value while stepwise varying an exposure quantity during the photography at a predetermined interval.

The above and other objects, features and advantages of the present invention will be explained hereinafter and may be better understood by reference to the drawings and the descriptive matter which follows.

DETAILED DESCRIPTION OF THE PREFERRED EMBODIMENTS (First Embodiment)

Figure 1:
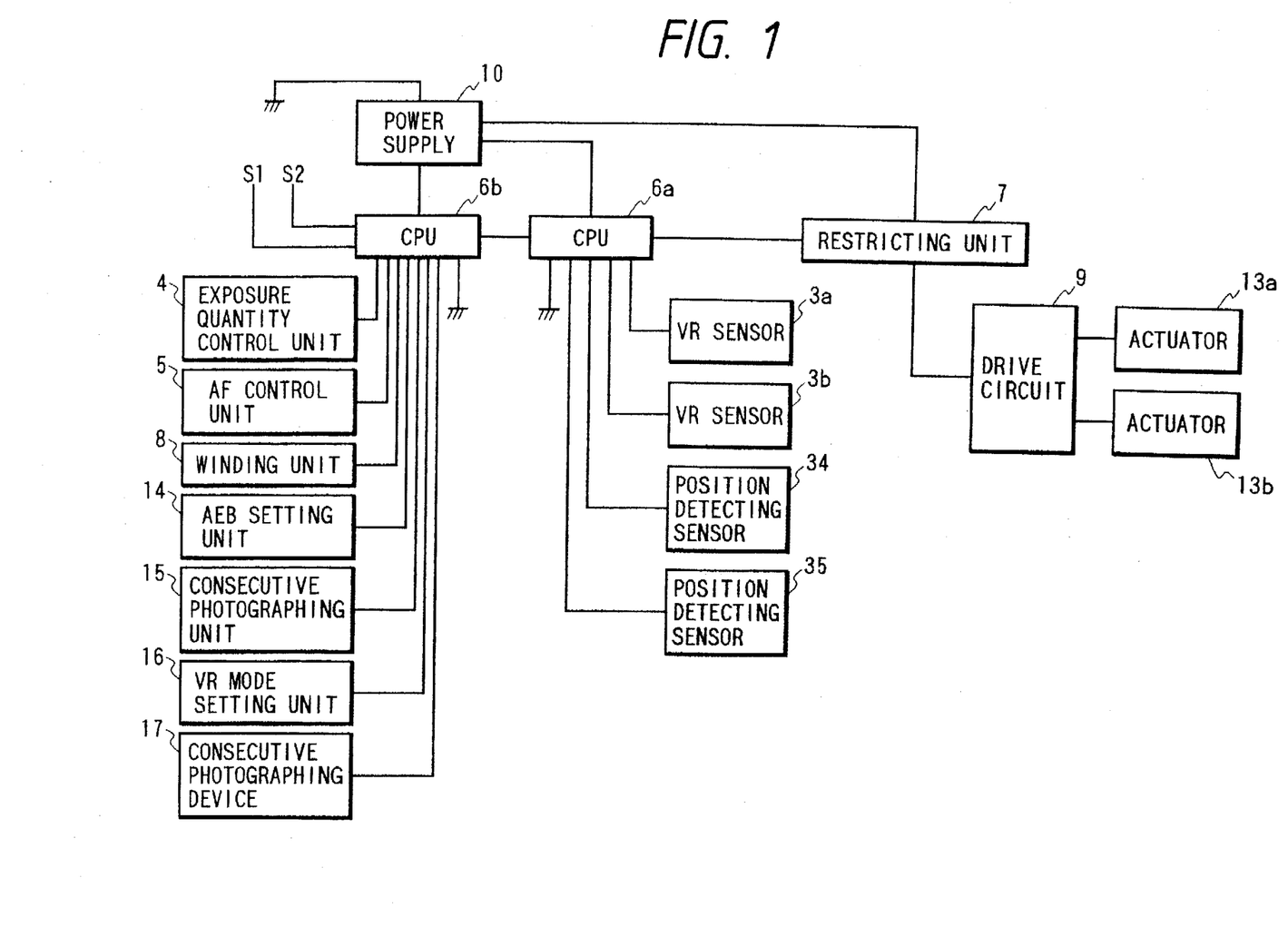
FIG. 1 is a block diagram of assistance in explaining a construction of an embodiment of the present invention.

FIG. 1 is a block diagram, showing a first embodiment of the present invention, of assistance in explaining a construction of a vibration reducing camera.

A power supply 10, upon turning ON an unillustrated main switch, supplies an apparatus in this embodiment with electric power.

A switch S1 is turned ON by half-depressing a release button, while a switch S2 is turned ON by fully depressing the release button. In accordance with the first embodiment, when the switch S1 is turned ON, there are executed photographic preparations such as adjusting a shutter speed and a focal length. Further, when the switch S2 is turned ON, a release operation is performed, thus starting an exposure.

A CPU 6a is an electronic circuit for controlling an AE sensor (not shown) for detecting a light quantity of an object, an AF sensor (not shown) for detecting a distance to the object, and, in addition, VR sensors 3a, 3b and position detecting sensors 34, 35, or detecting and processing outputs of these sensors. Herein, the VR sensor 3 is a sensor for detecting a camera shake. Based on the output of the VR sensor 3, the CPU 6a detects attitudes (position, velocity, acceleration, angle, angular speed, angular acceleration, etc.) of the camera at that moment. Also, the position detecting sensors 34, 35 are sensors for detecting a position of a lens frame 23 which will be mentioned later.

A CPU 6b is an electronic circuit for controlling an exposure quantity control unit 4 on the basis of detected results of the AE sensor and the AF sensor that are transmitted from the CPU 6a. Herein, the exposure quantity control unit 4 controls an unillustrated stop mechanism and shutter mechanism on the basis of a detected result of the AE sensor, thereby controlling an exposure quantity when photographed. An AF control unit 5 controls a focusing operation of an optical system (not shown) on the basis of an output of the AF sensor. Further, a winding unit 8 winds up a film after finishing the photography.

On the other hand, an AEB setting unit 14 sets a mode as to whether AE bracketing is performed (AEB mode) or not.

If the AEB mode is set, further, there are set the number of photographing frames (the number of exposures) in the AEB mode and a stepwise width of AEB (stepwise exposure width). With this setting, for example, it is feasible to set the AEB mode wherein totally three pieces of photos are taken with an overexposure having an EV value higher by 1.0 (corresponding to the stepwise width) than an EV value conceived proper by the camera and with an underexposure having an EV value lower by 1.0 than the proper EV value. Note that the variations in the EV value are attained by selecting one of such three methods that an exposure time is varied with a stop value being fixed, the stop value is changed with the exposure time being fixed, and both of the stop value and the exposure time are varied in accordance with the first embodiment.

A consecutive photographing device 17 serves to perform "consecutive photography". Further, a consecutive photography setting unit 15 is capable of selecting and setting any one of a consecutive photography mode for operating the consecutive photographing device and a non-consecutive photography mode for not operating the consecutive photographing device. When the consecutive photography setting unit 15 is set in the consecutive photography mode, an exposure command continues, i.e., the switch S2 is kept ON with a full-depression of the release switch, the consecutive photographing device 17 performs the consecutive photography.

Note that the AEB setting unit 14 sets the AEB mode, while the consecutive photography setting unit 15 sets the consecutive photography mode, and it is thereby possible to perform the consecutively taking photos corresponding to a number of photographing frames which number is set by the AEB setting unit 14 for a short period of time.

A VR mode setting unit 16 is capable of setting a full-time vibration reducing mode for reducing vibrations when the switch S1 is turned ON with a half-depression of the release switch, an exposure-time vibration reducing mode for reducing vibrations only when the switch S2 is turned ON with a full-depression of the release switch, and a non-reducing mode for reducing no vibrations. For instance, if the VR mode setting unit sets the exposure-time vibration reducing mode, the vibrations are not reduced during the half-depression of the release switch, and a photographer is able to observe the same image as that in the camera incorporating no vibration reducing function. Reversely, if set in the full-time vibration reducing mode, the reduction of the vibrations starts immediately when half-depressing the release switch, and the photographer is able to visually recognizing that the vibrations are being reduced.

Actuators 13a, 13b work to actuate a lens frame 23 within a plane substantially perpendicular to the optical axis. Details of the actuators 13 will be hereinafter be described with reference to FIG. 2.

A drive circuit 9 is a circuit for driving the actuators 13a, 13b by receiving a transmission of a control signal from the CPU 6a through a control unit 7.

Further, a control unit 7 is a circuit for detecting an electric current supplied to the drive circuit 9 from a power supply 10, and making a restriction so that a total value of the currents supplied to the actuators 13a, 13b does not exceed a predetermined value.

Figure 2:
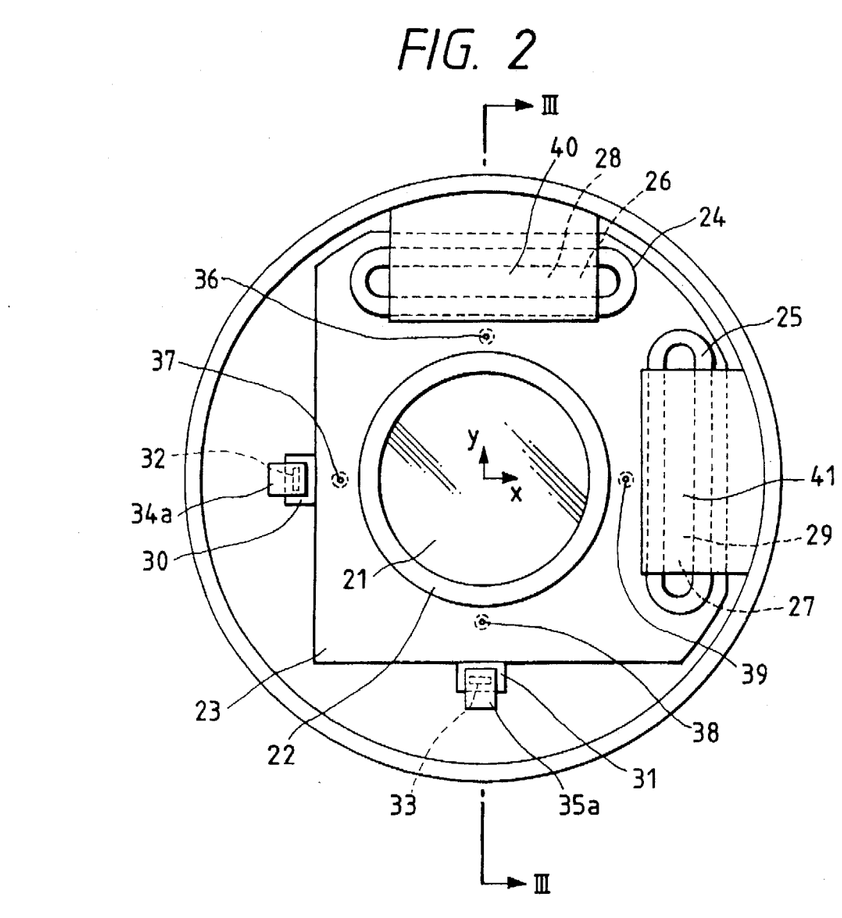
FIG. 2 is a front view of assistance in explaining a mechanism for moving a VR lens in the embodiment of the present invention.
Figure 3:
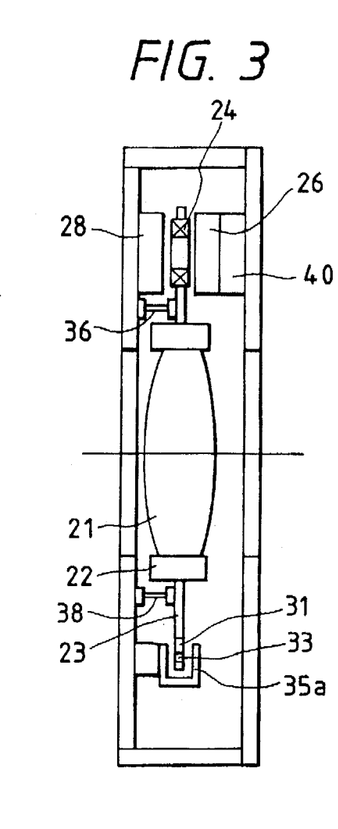
FIG. 3 is a sectional view taken along the line III—III of the mechanism for moving the VR lens shown in FIG. 2.

FIGS. 2 and 3 are diagrams of assistance in explaining a mechanism for moving a VR lens in the first embodiment. FIG. 2 is a front view illustrating a mechanism including the VR lens. FIG. 3 is a sectional view taken along the line III—III of FIG. 2.

A circular member depicted substantially at the center of FIG. 2 is a VR lens 21 in the first embodiment. The VR lens 21 is held by a lens chamber 22 on an outer periphery thereof, and, further, the lens chamber 22 is held by the lens frame 23 on its outer periphery.

Resilient members 36–39 are metallic wires for supporting the lens frame 23 within the lens barrel. The resilient member 36 is placed in parallel to the optical axis, and respective lengths thereof are substantially the same. Accordingly, the lens frame 23 supported by these resilient members is movable in an arbitrary direction within the plane substantially perpendicular to the optical axis, and, as a result of the movement, the lens frame 23 is never inclined to the surface thereof.

A coil 24, a magnet 26, yokes 27 and 40 (or a coil 25, a magnet 27, and yokes 29 and 40) are combined to constitute an actuator 13a (or 13b) shown in FIG. 1, a so-called voice coil motor (hereinafter referred to as "VCM").

Coils 24, 25 are coil members composed of thin and elongate conductive wires and take configuration similar to a track for an athletic competition, which configuration is defined by two rectilinear portions parallel to each other and two semicircular portions connecting the ends of these rectilinear portions, respectively. The coils 24, 25 are attached to an outer edge of the lens frame 23 so that vertical bisectors of those rectilinear portions intersect each other substantially at right-angles substantially at the center of the VR lens 21.

The yokes 28, 40 and the magnet 26 are members for forming a magnetic field acting across the coil 24 in the optical-axis direction. The yokes 28 and 40 are disposed so that the magnet 26 is interposed therebetween in the optical-axis direction. Further, the yoke 28 and the magnet 26 are disposed so that the coil 24 is interposed therebetween in the optical-axis direction. Similarly, the yokes 29, 41 and the magnet 27 are members for forming a magnetic field acting cross the coil 25. The yokes 29 and 41 are disposed so that the magnet 27 is interposed therebetween in the optical-axis direction, and the yoke 29 and the magnet 27 are disposed so that the coil 25 is interposed therebetween in the optical-axis direction.

On the other hand, the coils 24, 25 are connected to the above drive circuit 9 and supplied with the current from the power source 10 via the drive circuit 9. When the current flows across the coil 24 (25), an electromagnetic force (hereinafter referred to as a "thrusting force") between the current and a magnetic field generated by the magnet 26 (27). This thrusting force diverts depending on a direction of the current flowing across the coil 24 (25), and increases and decreases its magnitude in proportion to a magnitude of the current.

A lens position detecting unit 30 (31) is a protrusion located on a line of extension of the vertical bisector (x-axis) (vertical bisector (y-axis) of the coil 24) of the rectilinear portion of the coil 25 on the side surface of the lens frame 23, and is formed with a slit 32 (33) which can transmit the light beams.

A photo interrupter 34a (35a) is a member constructed mainly of a light projecting element and the light receiving portion, and the lens position detecting unit 30 (31) is so disposed as to be interposed between the light projecting element and the light receiving element (see FIG. 3). With this arrangement, the photo interrupter 34a (35a) is irradiated with light beams from the light projecting element. Then, the light receiving element detects the light beams penetrating the slit 32, whereby a movement quantity of the lens frame 23 in the x-axis direction (y-axis direction) can be detected. Data about the movement quantity of the lens frame 23 that is detected by the photo interrupter 34a is fed back to the CPU 6a, and the CPU 6a outputs a new control signal for controlling the actuator 13 to the drive circuit 9 on the basis of the above data. In accordance with the first embodiment, such an operation is repeated, thus disposing the VR lens 21 in a predetermined position and reducing the vibrations.

Next, an operation of the mechanism for moving the VR lens 21 will be explained.

As explained above, the drive circuit 9 receiving the transmission of the control signal from the CPU 6a supplies the coils 24, 25 with proper amounts of currents to drive the actuator 13. The VR lens 21 is thereby moved by the electromagnetic force (thrusting force) generated by mutual action between the currents flowing across the coils 24, 25 and the magnetic fields generate from the magnets 26, 27. When the VR lens 21 is moved by this thrusting force from the center of the optical-axis, the resilient members 36–39 supporting the lens frame 23 become resilient enough to generate a spring force acting toward the optical axis. As a result, the VR lens 21 moves up to such a position that the thrusting force generated by the coils 24, 25 equilibrates with the spring force generated by the resilient members 36–39.

Herein, as a matter of fact, a mass of the whole mechanism for moving the VR lens 21 makes a gravity-directional force act upon the resilient members 36–39. In addition, when controlling the movement of the VR lens 21, a variety of forces are generated, and hence it follows that the VR lens 21 moves to such a position that the thrusting force equilibrates with these forces. Furthermore, back electromotive forces are generated in the coils 24, 25 due to the movement of the VR lens 21, and therefore the thrusting force generated by the VCM decreases, with the result that the VR lens 21 moves to a position of equilibrium between the decreased thrusting force and the spring force.

Figure 4A:
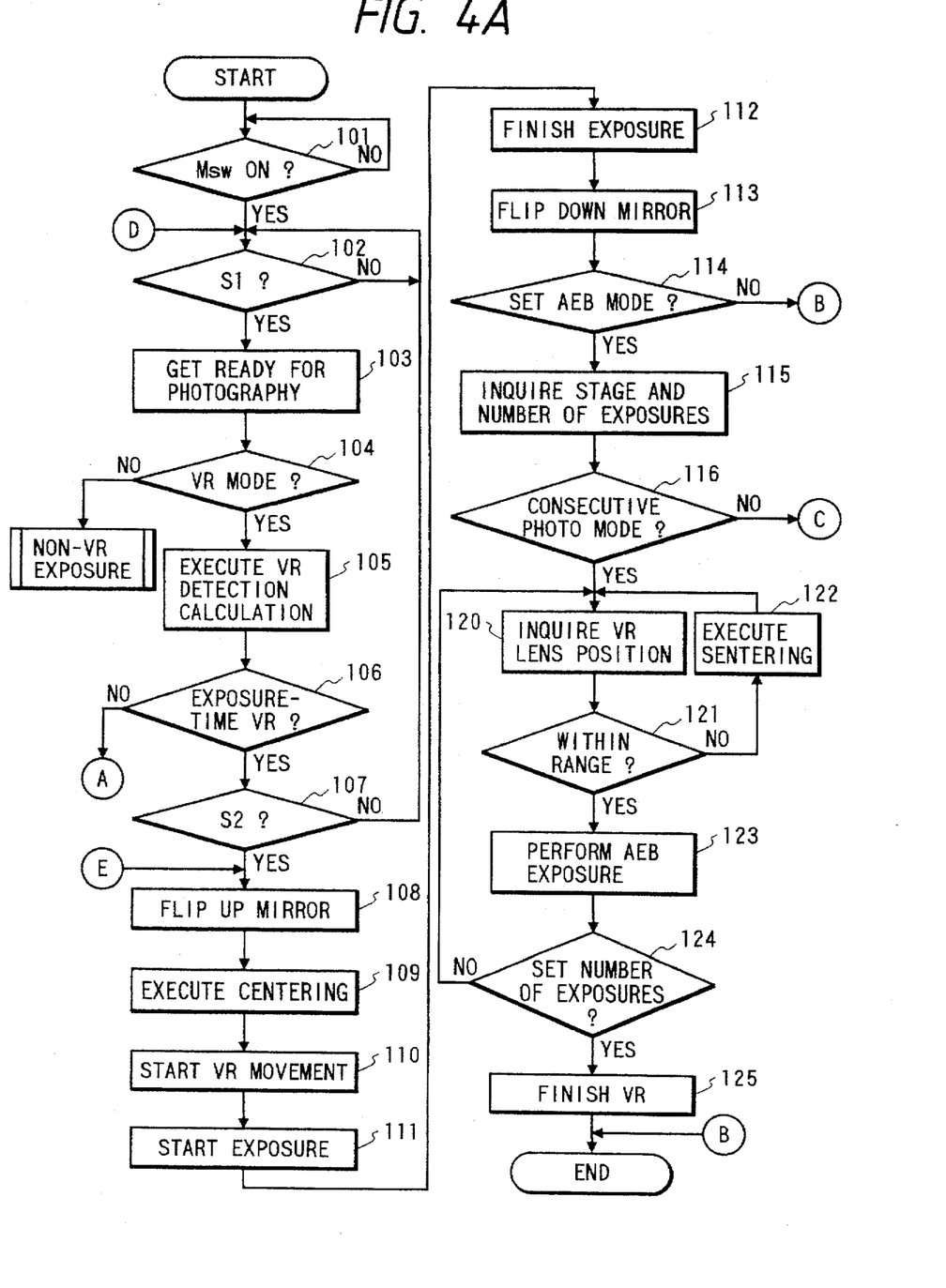
FIGS. 4A–4C are flowcharts showing an operation in the embodiment of the present invention.
Figure 4B:
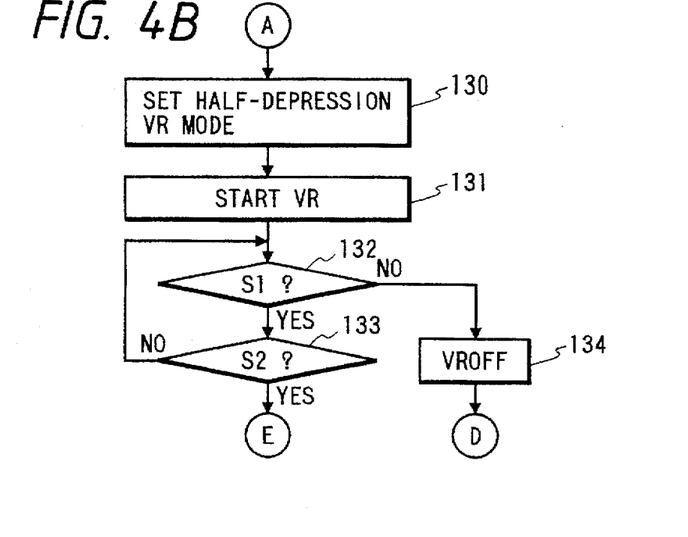
Figure 4C:
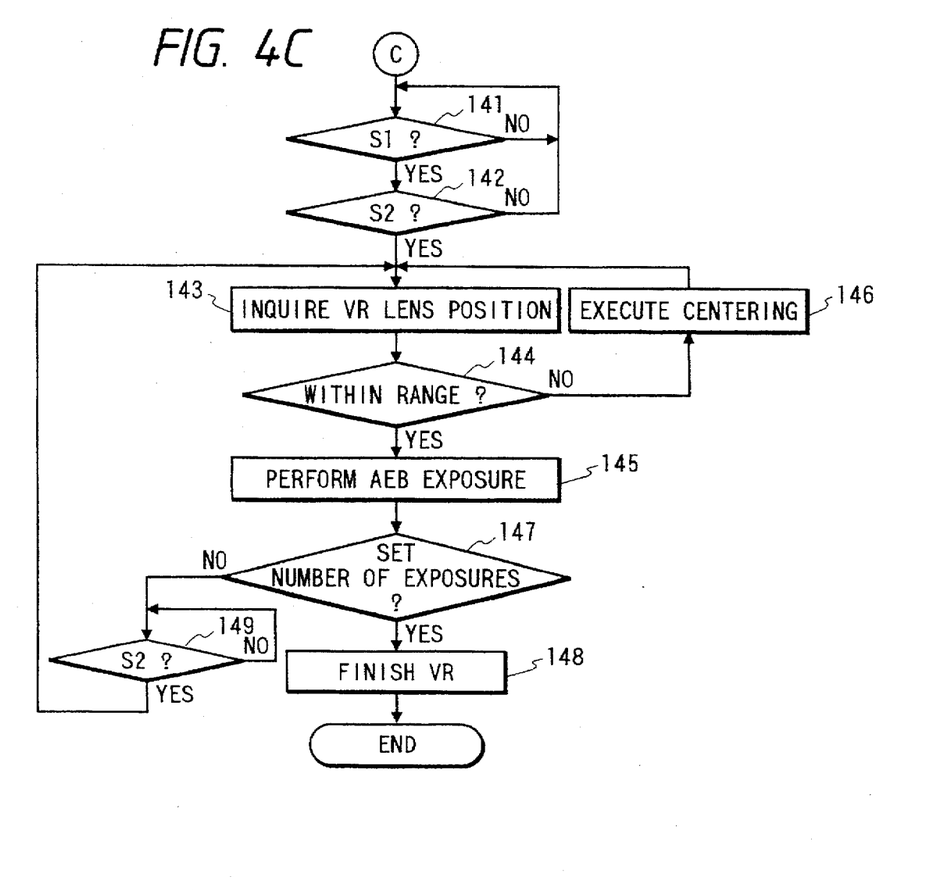

Next, the operation of the first embodiment will be explained with reference to FIGS. 4A–4C. FIGS. 4A–4C are flowcharts showing the operation in the first embodiment.

In accordance with the first embodiment, after turning ON the main switch (Step 101: Yes), the release switch is half-depressed. When switch S1 is turned ON (Step 102: Yes), the VR sensor 3, the AE sensor and the AF sensor are supplied with the electric power and thereby brought into a working state (Step 103). Further, the exposure quantity control unit 4 and the AF control unit 5 are supplied with the electric power and thereby brought into the working state. Then, a shutter speed and a focal length are adjusted based on the outputs of the AE sensor and the AF sensor (Step 103).

Next, the mode set by the VR mode setting unit is confirmed (Step 104). If the full-time VR mode or the exposure-time VR mode is set by the VR mode setting unit (Step 104: Yes), the CPU 6a calculates a moving quantity, a moving velocity and moving direction of the VR lens 21 on the basis of the output of the VR sensor, which are needed for reducing the vibrations (Step 105).

Next, according to the setting in the first embodiment, whether or not the VR mode setting unit 16 sets the exposure-time vibration reducing mode, is determined (Step 106). If the result is Yes, the VR drive is not started, but the processing moves to a next operation.

In the next operation, the release button is fully depressed, and, when the switch S2 is turned ON (Step 107: Yes), the mirror flips up (Step 108). Subsequently, centering of the VR lens is carried out (Step 109). More specifically, the CPU 6a controls the actuator 13, and then moves and locates the VR lens 21 so that the center of the VR lens 21 coincides with an optical axis of a photographing optical system. In the first embodiment, it is thereby feasible to maximize a range here the vibrations are reduced by the VR lens 21, i.e., a range where the VR lens 21 can be VR-moved.

Next, the VR movement of the VR lens 21 is started (Step 110), and there is reduced a vibration of the object image on the photographing surface due to the camera shake. Further, immediately after starting the VR movement, the exposure is started (Step 111). That is, the aperture is stopped down with a predetermined quantity, and the shutter is opened. After a predetermined time has elapsed, the shutter is closed, and the exposure is finished (Step 112). At this time, the aperture is opened, and the shutter is immediately charged. When a series of those operations pertaining to the exposure are finished, a quick return mirror flips down (Step 113).

Checked next is whether or not the AEB setting unit sets the AEB mode (Step 114). If the AEB mode is set (Step 114: Yes), a stage of the set exposure and the number of exposures are confirmed (Step 115).

Checked further is whether or not the consecutive photographing unit sets the consecutive photographic mode. If set in the consecutive photographic mode (Step 116: Yes), a position of the VR lens is obtained based on the position detecting sensors 34, 35 (Step 120).

Checked next is whether or not the VR lens is located within a predetermined movement allowable range (Step 121). More specifically, the CPU 6b performs the calculations which follow. To start with, the allowable range of movement distance D of the VR lens 21 is determined by the following formula. Note that the movement allowable limit implies a circle having a predetermined radius about the centering position of the VR lens 21, and this radius is determined by the following formula:

$$0 \leq D \leq ((n-1)/N)L; \; n>1 \quad (1)$$

In the following formula (1), the symbol L designates a maximum distance (hereinafter referred to as a "movable maximum distance") of the photographing optical system from the optical axis, at which the VR lens is movable without exerting any influence of aberration upon the object image on the photographing surface. This value is determined by an optical characteristic of the photographing optical system adopted in the first embodiment.

The symbol N is the number of exposures that is set by the AEB setting unit, and n is the number of next exposures. In Steps 111 and 112, however, the first exposure has already been executed, and therefore n takes a value of 2 or larger.

On the other hand, a distance X(n) between the center of the VR lens and the optical axis of the photographing optical system before an n-th exposure, is calculated. Then, the following relationship is checked:

$$((n-1)/N)L > X(n) \quad (2)$$

If the formula (2) is not established (Step 121: No), the centering of the VR lens is executed (Step 122), and the relationship in the formula (2) is rechecked. While on the other hand, if the formula (2) is established (Step 121: Yes), the next exposure based on the AEB mode takes place (Step 123).

As for the operations in Steps 120–123, there will be specifically exemplified a case where L is, e.g., 3 mm, and N is set to three. In this case, if the central position of the VR lens 21 before the second exposure falls within a radial range of 1 mm with respect to the optical axis of the photographing optical system, the centering is not performed, and the next exposing operation is started while the VR drive of the VR lens 21 continues. On the other hand, if far beyond the radial range of 1 mm, the next exposing operation is carried out after the execution of the centering.

Further, before the third exposure, whether or not the central position of the VR lens 21 falls within a radial range of 2 mm with respect to the optical axis, is checked. If within this range, no centering is effected, and the next exposing operation is performed. Whereas if far beyond the range, the next exposure is executed after the execution of the centering.

Generally, if the same photographer takes a photo substantially under the same conditions, there might be little possibility in which the vibration quantity largely fluctuates at intervals of the respective photographing operations consecutively performed. This will be described by way of a specific example as given above. If there is caused such vibrations that the VR lens 21 requires only 1 mm or more at an interval between the first exposure and the second exposure, it implies that there might be little possibility in which the vibrations are caused enough for the VR lens 21 to move 1 mm or more during the second exposure. Further, if the VR lens 21 does not require the movement of 1 mm or more at an interval between the second exposure and the third exposure too, the assumption is that the vibrated state be comparatively stable. Hence, the possibility in which the VR lens will move 1 mm or more during the third exposure, becomes still smaller than ever. Accordingly, in this case, even if the centering of the VR lens 21 is omitted before the second and third exposures, there might be a small possibility in which the VR lens 21 reaches the movable limit enough to be impossible of normally reducing the vibrations.

Under such circumstances, an emphasis in the embodiment is put on such a point that there is a high possibility in which a series of photographing operations in the AEB mode are performed under the same photographing conditions, and the number of centering processes of the VR lens 21 is restrained down to the minimum required by comparing the moving distance of the VR lens 21 during each exposure with a predetermined distance obtained taking the number of exposures in the AEB mode into consideration. Hence, in accordance with the first embodiment, a series of framing processes of the photos taken in the AEB mode are prevented from being different from each other due to an unnecessary centering process of the VR lens 21. This may be especially useful effect in terms of considering an AEB original purpose purporting that the photography with an exposure quantity under or over the exposure quantity determined by the camera is performed based on the same framing.

Further, in accordance with the first embodiment, if set simultaneously in the AEB mode and in the consecutive photographing mode, it is possible to prevent a photographing interval from elongating because of performing the centering for every exposure, and a consecutive photographic frame speed from decreasing. Accordingly, the photography can be completed before the object moves.

Further, in accordance with the first embodiment, the electric power for the camera can be also saved by restraining a quantity of power consumption caused by the centering operation.

The operations in Steps 120–123 are continuously effected corresponding to the number of exposures that is set by the AEB setting unit 14 (Step 124: No). When finishing the exposures corresponding to the set number thereof, the VR movement of the VR lens 21 comes to an end (Step 125), and, in this embodiment, the operation thereof is finished. Note that as obvious from the above flowcharts, in accordance with the first embodiment, the same operations as those when set in the full-time vibration reducing mode are carried out even if the vibration reducing mode is set in the exposure-time vibration reducing mode in such a case that the answers both in Step 114 and in Step 116 are Yes. As a result, the reduction of the vibrations is stopped at the exposure-to-exposure interval, thereby preventing the framing of each of photos consecutively taken in the AEB mode from being different.

On the other hand, in above Step 104, if set in the non-reducing mode (Step 104: No), according to a flowchart different from the above-shown flowchart, the operations such as the exposure including no VR mode are carried out.

Further, when the answer in Step 106 is No, the VR mode is the full-time vibration reducing mode for making the VR movement while the switch S1 is ON, and hence immediately the VR movement starts (Step 131). Further, when confirming that the switch S1 is ON (Step 132: Yes) and the switch S2 is ON (Step 133: Yes), the quick return mirror flips up (Step 108), and the same operations as the above-mentioned are performed in Step 109 onward.

Note that when the photographer completely releases the release switch in the course of the consecutive photography, i.e., when the switch S1 is OFF (Step 132: No), the operation of the camera returns to Step 102 after finishing the VR movement of the VR lens 21 (Step 134).

In Step 114, if the AEB setting unit does not set the AEB mode (Step 114: No), the operation comes to an end to perform only the photography with a normal exposure quantity.

In Step 116, if the consecutive photographing unit does not set the consecutive mode (Step 116: No), the AEB mode is executed, but the consecutive mode is not executed. That is, the operation proceeds to Steps 141 and 142. After confirming that the switches S1 and S2 are ON, the same operations as Steps 120–124 are executed in Steps 143–147. Note that the exposure is done by the manual operation in this case, and therefore, after the end of the second exposure, whether or not the switch S2 is ON is checked each time the exposure is done before entering the next exposure operation (at an interval between Step 147 and Step 143).

(Second Embodiment)

Next, a second embodiment of the present invention will be discussed.

A formula for defining the movement allowable range of the VR lens 21 in Step 121 in FIG. 4A and Step 144 in FIG. 4C may be established otherwise in addition to the formula (1) shown in the first embodiment. Then, in accordance with the second embodiment, the allowable range of movable distance D is determined based on the formula (3) which follows:

$$0 \leq D \leq (1/(N-n+2))L; \ n>1 \tag{3}$$

According to the formula (3), if the number of exposures that is set by the AEB setting unit 14 is assumed to be 5, a content determined in Step 121 or 144 before the second exposure is expressed such as:

$$(\tfrac{1}{5})L > X(2) \tag{4}$$

If the formula (4) is established, no centering carried out. Whereas if not established, the centering is executed.

However, X(n) is a distance between the optical axis of the photographing system and the center of the VR lens 21 before starting the n-th exposure. Similarly, at the fourth exposure and before the final exposure, the distances therebetween are respectively given by:

$$(\tfrac{1}{3})L > X(3) \tag{5}$$

$$(\tfrac{1}{2})L > X(4) \tag{6}$$

In accordance with the first embodiment, if no centering is effected before the final exposure (the N-th exposure) (Step 120: Yes, or Step 144: Yes), the distance at which the VR lens 21 is movable in a direction farther from the optical axis is (1/N)L at the minimum. Therefore, the same distance is remarkably short if the value of N is large. In case the vibration quantity suddenly increases when an unexpected situation happens, the VR lens 21 reaches the movable limit, and there might be such a possibility that the vibrations are not sufficiently reduced. In this respect, in accordance with the second embodiment, the movement allowable range determined before the N-th exposure becomes (½)L irrespective of the value of the set number-of-exposures N. Accordingly, in the second embodiment, even if the number-of-exposures N is large, the movable range of the VR lens 21 is secured enough up to the last exposure, and the possibility of the vibration being reduced incompletely is decreased.

(Third Embodiment)

Next, a third embodiment of the present invention will be explained. A difference of the third embodiment from the first or second embodiment is that the movement distance D allowable range of the VR lens 21 is, in Step 121 in FIG. 4A and in Step 144 in FIG. 4C, determined based on the formula (7) which follows:

$$0 \leq D \leq (1/(N-n+2)) \ (L-X(n-1))+X(n-1); \ n>1, \ and \ X(1)=0 \tag{7}$$

Hence, in accordance with the third embodiment, in Step 121 in FIG. 4A and in Step 144 in FIG. 4C, a validity of the following formula (8) is determined.

$$(1/(N-n+2)) \ (L-X(n-1))+X(n-1) > X(n) \tag{8}$$

Namely, in the third embodiment, if a distance at which the VR lens 21 moves during an (n−1)th exposure is greater than a distance obtained by subtracting, from L, a distance X(n−1) between the centering position and the center of the VR lens 21 before the (n−1)th exposure and further by dividing it by a number of theretofore non-exposures, the VR lens 21 undergoes the centering process. That is, in accordance with the third embodiment, the movement allowable range is determined in consideration of the distance at which the VR lens has already moved and the number of non-exposures. A characteristic thereof is that it is possible, with this determination, to accurately determine whether the centering should be performed or not under even such a photographing condition that the vibration quantity fluctuates sharply.

(Fourth Embodiment)

Next, a fourth embodiment of the present invention will be explained. A difference of the fourth embodiment from the first through third embodiments is that the movement distance D allowable range of the VR lens 21 is, in Step 121 in FIG. 4A and in Step 144 in FIG. 4C, determined based on the formula (9) which follows:

$$0 \leq D \leq (T(n-1)/T(N))L; \quad (9)$$

$n > 1$, and $$T(n) = t(1) + t(2) + \ldots + t(n-1) + t(n)$$

where t(n) is the exposure time of the n-th photography.

In accordance with the fourth embodiment, before the n-th exposure, if a distance between the center of the VR lens 21 and the centering position is greater than a distance proportional to a cumulative value of the respective exposure times up to the (n−1)th exposure, the centering is effected. Namely, an emphasis of the forth embodiment is put on such a point that the quantity with which the VR lens 21 moves during one exposure is inevitably different depending on a length of the exposure time even in the same vibrated state. A characteristic of the fourth embodiment is that the AEB setting unit sets largely a level of changing the exposure, and as a result it is feasible to accurately determine whether or not the centering should be effected even if the exposure time largely changes between the respective photographing operations.

(Variant of First Embodiment)

Next, a variant of the first embodiment will be discussed. A difference of this modified embodiment from the first embodiment is that the movement allowable range of the VR lens 21 is, in Step 121 in FIG. 4A and in Step 144 in FIG. 4C, determined based on the starting formula (1) but is, after the VR lens 21 is moved beyond the movement allowable range (Step 122 or 146), determined based on the formula (3) or (7). In accordance with this modified embodiment, at the initial stage of the operation, because of adopting the formula (1), the control logic is simple, and whether the centering is required or not is determined by a method with a shorter calculation time during the control. When determining that the centering is not required before each exposure (Step 121: Yes, Step 144: Yes), the presumption is that the vibrated state during the photographing is sufficiently small and stable, and therefore the control based on the formula (1) can be performed up to the last exposure.

On the other hand, when determining that the centering is required to be done in the course of the operation (Step 121: No, Step 144: No), the presumption is that the vibrations during the photographing are large or stable. Then, in accordance with the fourth embodiment, the centering of the VR lens 21 is executed, and the formula (1) is replaced with the formula (3) or (7). As in the second or third embodiment, the operation is performed corresponding properly to the vibrations.

Thus, in accordance with the fourth embodiment, it is feasible to execute the certain vibration reducing drive up to the last exposure while restraining the number of centering processes down to the minimum by automatically changing the control conditions to the adequate conditions, corresponding to the state of the vibrations.

(Other Embodiments)

Note that the present invention is not limited to the embodiments discussed above. The embodiments described above are the exemplifications.

For instance, the first to fourth embodiments have dealt with the vibration reducing camera having only one conditional formula for defining the movement allowable range in Step 121 or 144. The vibration reducing camera may be the one incorporating all the formulae (1), (3), (7) and (9), wherein the photographer is able to select one conditional formula suited to the photographic condition by an external operation.

Further, the modification of the first embodiment has dealt with the case where the formula (1) is adopted as a starting formula, and thereafter this formula is replaced with the formula (2) or (3). This is, however, one exemplification. The formula adopted for the first time may be any one of the formulae (1), (3), (7) and (9), depending on the photographic conditions, and thereafter the selected formula may also be changed to any one of other three formulae.

Further, in each of the embodiments discussed above may further add a condition purporting presetting of the exposures which are effected sequentially from the one having a longer exposure time or from the one having a shorter exposure time. With this addition of the condition, the number of centering processes can be restrained more effectively than before.

Therefore, it is intended that the invention not be limited to the preferred embodiments described herein, but that the invention will include all embodiments falling within the scope of the appended claims.

What is claimed is:

1. A vibration reducing camera comprising:
   a vibration reducing optical system;
   a vibration reducing drive unit for reducing vibrations by changing a state of said vibration reducing optical system;
   a state detecting unit for detecting a state of said vibration reducing optical system;
   a fixing unit for fixing said vibration reduction optical system in a predetermined initial state;
   a photographic condition changing unit for performing a predetermined number of photographing operations while stepwise changing a part of photographic conditions;
   a photographic condition setting unit for setting at least a number of exposures in said photographic condition changing unit; and
   a control unit for controlling said vibration reducing drive unit, said state detecting unit, said fixing unit and said photographic condition changing unit,
   wherein said control unit defines the allowable range of variation quantity of said vibration reducing optical system on the basis of a number of exposures and an already-exposed number that are set in said photographic condition setting unit.

2. A vibration reducing camera according to claim 1, wherein said control unit operates said fixing unit when a state of said vibration reducing optical system that is obtained as a result of detection of said state detecting unit is beyond a variation quantity allowable range.

3. A vibration reducing camera according to claim 1, further comprising:
   a consecutive photographing device for performing consecutive photography;
   a consecutive photography setting unit capable of setting a consecutive photographing mode of operating said consecutive photographing device, or a non-consecutive photographing mode of not operating said consecutive photographing device; and
   a vibration reducing mode setting unit capable of an exposure-time vibration reducing mode of making said vibration reducing drive unit reduce vibrations during only an exposure, or a full-time vibration reducing mode of making said vibration reducing drive unit reduce the vibrations during the exposure and a non-exposure time,
   wherein said control unit controls said vibration reducing drive unit so that the vibrations are continuously reduced during even the non-exposure time when said consecutive photography setting unit sets the consecutive photographing mode while said vibration reducing mode setting unit sets an exposure-time vibration reducing mode in a case where said photographic condition changing unit operates.

4. A vibration reducing camera according to claim 1, wherein the allowable range of variation quantity D of said vibration reducing optical system that is determined by said control unit before starting an n-th exposure is given such as:

$$0 \leq D \leq ((n-1)/N)L; \ n>1$$

where L is the maximum variation quantity with which said vibration reducing vibration optical system is variable, and N is the number of exposures that is set by said photographing condition setting unit.

5. A vibration reducing camera according to claim 1, wherein the allowable range of variation quantity D of said vibration reducing optical system that is determined by said control unit before starting the n-th exposure is given such as:

$$0 \leq D \leq (1/(N-n+2))L; \ n>1$$

where L is the maximum variation quantity with which said vibration reducing vibration optical system is variable, and N is the number of exposures that is set by said photographing condition setting unit.

6. A vibration reducing camera according to claim if wherein the allowable range of variation quantity D of said vibration reducing optical system that is determined by said control unit before starting an n-th exposure is given such as:

$$0 \leq D \leq (1/(N-n+2))(L-X(n-1))+X(n-1);$$

$$n>1, X(1)=0$$

where L is the maximum variation quantity with which said vibration reducing vibration optical system is variable, N is the number of exposures that is set by said photographing condition setting unit, and X(n) is the variation quantity of said vibration reducing optical system before starting the n-th exposure.

7. A vibration reducing camera according to claim 1, wherein the allowable range of variation quantity D of said vibration reducing optical system that is determined by said control unit before starting the n-th exposure is given such as:

$$0 \leq D \leq (T(n-1)/T(N))L$$

$$n>1, T(n)=t(1)+t(2)+ \ldots +t(n-1)+t(n)$$

where L is the maximum variation quantity with which said vibration reducing vibration optical system is variable, N is the number of exposures that is set by said photographing condition setting unit, and t(n) is the exposure time of the n-th exposure.

8. A vibration reducing camera according to claim 1, wherein the allowable range of variation quantity D of said vibration reducing optical system that is determined by said control unit before starting an n-th exposure is set in any one of the following four ranges and, after operating said fixing unit at first, changed to others among the four ranges:

$$0 \leq D \leq ((n-1)/N)L; \ n>1$$

$$0 \leq D \leq (1/(N-n+2))L; \ n>1$$

$$0 \leq D \leq (1/(N-n+2))(L-X(n-1))+X(n-1);$$

$$n>1, X(1)=0$$

$$0 \leq D \leq (T(n-1)/T(N))L;$$

$$n>1, T(n)=t(1)+t(2)+ \ldots +t(n-1)+t(n)$$

where L is the maximum variation quantity with which said vibration reducing vibration optical system is variable, N is the number of exposures that is set by said photographing condition setting unit, X(n) is the variation quantity of said vibration reducing optical system before starting the n-th exposure, and t(n) is the exposure time of the n-th exposure.

9. A vibration reducing camera according to claim 4, wherein said control unit operates said fixing unit before the first exposure.

10. A vibration reducing camera according to claim 5, wherein said control unit operates said fixing unit before the first exposure.

11. A vibration reducing camera according to claim 6, wherein said control unit operates said fixing unit before the first exposure.

12. A vibration reducing camera according to claim 7, wherein said control unit operates said fixing unit before the first exposure.

13. A vibration reducing camera according to claim 1, wherein said photographic condition changing unit is an AE bracketing device for executing a predetermined number of exposures by changing one or both of a shutter speed and a stop value while stepwise varying an exposure quantity during the photography at a predetermined interval.

14. A vibration reducing camera comprising:
   a vibration reducing optical system;
   a vibration reducing drive unit to reduce vibrations by changing a state of said vibration reducing optical system;
   a state detecting unit to detect a state of said vibration reducing optical system;
   a photographic condition changing unit to perform a predetermined number of photographing operations while stepwise changing a part of photographic conditions;
   a photographic condition setting unit to set at least a number of exposures in said photographic condition changing unit; and
   a control unit to control said vibration reducing drive unit, said state detecting unit, and said photographic condition changing unit,
   wherein said control unit defines an allowable range of variation quantity of said vibration reducing optical system on the basis of a number of exposures and an already-exposed number that are set in said photographic condition setting unit.

15. A vibration reducing camera according to claim 14, further comprising:
   a consecutive photographing device to perform consecutive photography;
   a consecutive photography setting unit capable of setting a consecutive photographing mode of operating said consecutive photographing device, or a non-consecutive photographing mode of not operating said consecutive photographing device; and
   a vibration reducing mode setting unit capable of an exposure-time vibration reducing mode of making said vibration reducing drive unit reduce vibrations during only an exposure, or a full-time vibration reducing mode of making said vibration reducing drive unit reduce the vibrations during the exposure and a non-exposure time, wherein said control unit controls said vibration reducing drive unit so that the vibrations are continuously reduced during even the non-exposure time when said consecutive photography setting unit sets the consecutive photographing mode while said vibration reducing mode setting unit sets an exposure-time vibration reducing mode in a case where said photographic condition changing unit operates.

16. A vibration reducing camera according to claims 14, wherein the allowable range of variation quantity D of said vibration reducing optical system that is determined by said control unit before starting an n-th exposure is given as:

$$0 \leq D \leq ((n-1)/N)L;\ n>1$$

where L is the maximum variation quantity with which said vibration reducing vibration optical system is variable, and N is the number of exposures that is set by said photographing condition setting unit.

17. A vibration reducing camera according to claim 14, wherein the allowable range of variation quantity D of said vibration reducing optical system that is determined by said control unit before starting the n-th exposure is given as:

$$0 \leq D \leq (1/(N-n+2))\ L;\ n>1$$

where L is the maximum variation quantity with which said vibration reducing optical system is variable, and N is the number of exposures that is set by said photographing condition setting unit.

18. A vibration reducing camera according to claim 14, wherein the allowable range of variation quantity D of said vibration reducing optical system that is determined by said control unit before starting an n-th exposure is given as:

$$0 \leq D \leq (1/(N-n+2))\ (L-X(n-1))+X(n-1);\ n>1,\ X(1)=0$$

where L is the maximum variation quantity with which said vibration reducing optical system is variable, N is the number of exposures that is set by said photographing condition setting unit, and X(n) is the variation quantity of said vibration reducing optical system before starting the n-th exposure.

19. A vibration reducing camera according to claim 14, wherein the allowable range of variation quantity D of said vibration reducing optical system that is determined by said control unit before starting the n-th exposure is given as:

$$0 \leq D \leq (T(n-1)/T(N))L$$

$$n>1,\ T(n)=t(1)+t(2)+\ldots+t(n-1)+t(n)$$

where L is the maximum variation quantity with which said vibration reducing optical system is variable, N is the number of exposures that is set by said photographing condition setting unit, and t(n) is the exposure time of the n-th exposure.

* * * * *

UNITED STATES PATENT AND TRADEMARK OFFICE
CERTIFICATE OF CORRECTION

PATENT NO. : 5,740,470
DATED : April 14, 1998
INVENTOR(S) : Yoshihisa Kitagawa, et al.

It is certified that error appears in the above-identified patent and that said Letters Patent is hereby corrected as shown below:

Column 13, line 29, claim 6, after "claim" delete "if" and insert --1--.

Signed and Sealed this

Twenty-first Day of July, 1998

Attest:

BRUCE LEHMAN

Attesting Officer    Commissioner of Patents and Trademarks